US012164243B2

(12) United States Patent
Kureyama et al.

(10) Patent No.: US 12,164,243 B2
(45) Date of Patent: Dec. 10, 2024

(54) DEVELOPING DEVICE AND IMAGE FORMING APPARATUS

(71) Applicant: FUJIFILM Business Innovation Corp., Tokyo (JP)

(72) Inventors: Tadashi Kureyama, Kanagawa (JP); Toshio Takiguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/948,205

(22) Filed: Sep. 19, 2022

(65) Prior Publication Data

US 2023/0305431 A1 Sep. 28, 2023

(30) Foreign Application Priority Data

Mar. 24, 2022 (JP) ................................ 2022-049096

(51) Int. Cl.
*G03G 15/08* (2006.01)

(52) U.S. Cl.
CPC . *G03G 15/0817* (2013.01); *G03G 2215/0872* (2013.01)

(58) Field of Classification Search
CPC ........... G03G 15/0817; G03G 15/0822; G03G 15/0865; G03G 15/0877; G03G 15/0881; G03G 15/0886; G03G 15/0891
See application file for complete search history.

(56) References Cited

U.S. PATENT DOCUMENTS

2007/0258727 A1* 11/2007 Shinoda ............. G03G 21/1832 399/106

FOREIGN PATENT DOCUMENTS

JP 2006139073 6/2006
JP 2006250973 9/2006

* cited by examiner

*Primary Examiner* — Walter L Lindsay, Jr.
*Assistant Examiner* — Andrew V Do
(74) *Attorney, Agent, or Firm* — JCIPRNET

(57) ABSTRACT

A developing device includes a first housing member, and a second housing member that is configured by combining a housing, in which a developer accommodation space accommodating a developer and a roll accommodation space accommodating a development roll are provided, and the first housing member with each other and that includes an integrated member obtained by integrally forming a frame-shaped seal attachment portion and an outer shell portion with each other, the seal attachment portion being a portion to which a seal member separating the developer accommodation space and the roll accommodation space from each other is attached, the outer shell portion constituting an outer shell that separates an inside and an outside of the housing from each other.

15 Claims, 7 Drawing Sheets

DEVELOPING DEVICE AND IMAGE FORMING APPARATUS

CROSS-REFERENCE TO RELATED APPLICATIONS

This application is based on and claims priority under 35 USC 119 from Japanese Patent Application No. 2022-049096 filed Mar. 24, 2022.

BACKGROUND

(i) Technical Field

The present disclosure relates to a developing device and an image forming apparatus.

(ii) Related Art

A developing device described in JP2006-139073A includes a development sleeve, a development container including a developer storage portion for supply of the developer to the development sleeve, a sealing sheet that seals the developer, and a sealing plate to which the sealing sheet is affixed.

SUMMARY

Here, in a case where a member including a frame-shaped seal attachment portion to which a heat welding seal (sealing seal) is attached is disposed in a housing and the size of a developing device is made small, there is no extra space in the housing. In this case, it is difficult to secure the rigidity of the seal attachment portion, and the seal attachment portion is likely to be bent.

Aspects of non-limiting embodiments of the present disclosure relate to a developing device and an image forming apparatus with which it is possible to restrain a seal attachment portion from being bent without an increase in housing size in comparison with a case where a member with the seal attachment portion is completed only inside the housing.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a developing device including a first housing member, and a second housing member that is configured by combining a housing, in which a developer accommodation space accommodating a developer and a roll accommodation space accommodating a development roll are provided, and the first housing member with each other and that includes an integrated member obtained by integrally forming a frame-shaped seal attachment portion and an outer shell portion with each other, the seal attachment portion being a portion to which a seal member separating the developer accommodation space and the roll accommodation space from each other is attached, the outer shell portion constituting an outer shell that separates an inside and an outside of the housing from each other.

BRIEF DESCRIPTION OF THE DRAWINGS

Exemplary embodiment(s) of the present invention will be described in detail based on the following figures, wherein.

DETAILED DESCRIPTION

Figure 1:
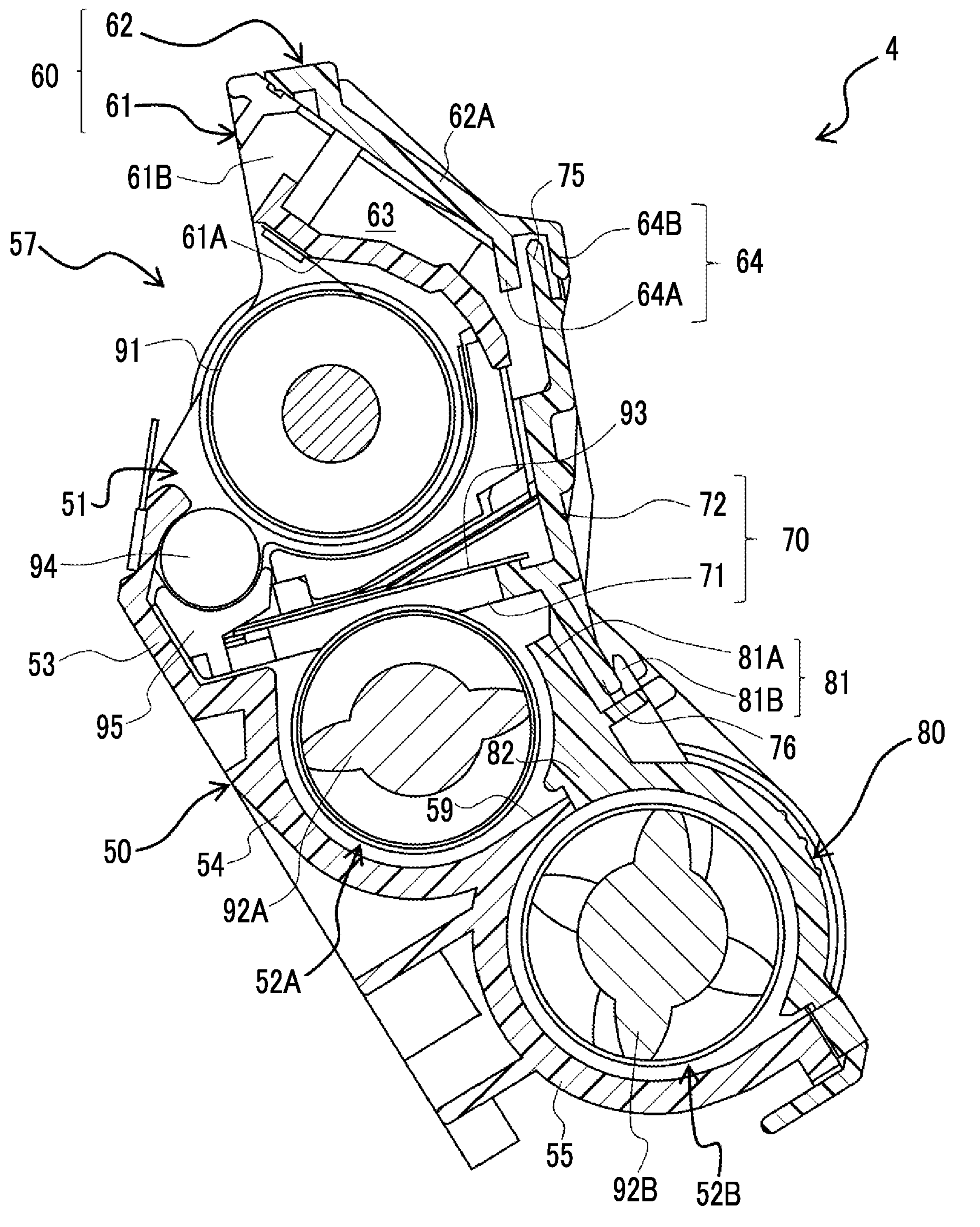
FIG. 1 is a cross-sectional view illustrating a developing device according to the present exemplary embodiment.

An example of the image forming apparatus according to the present exemplary embodiment will be shown below, but the present invention is not limited thereto. Hereinafter, among the parts shown in the drawing, main parts will be described, and others will not be described.

Figure 7:
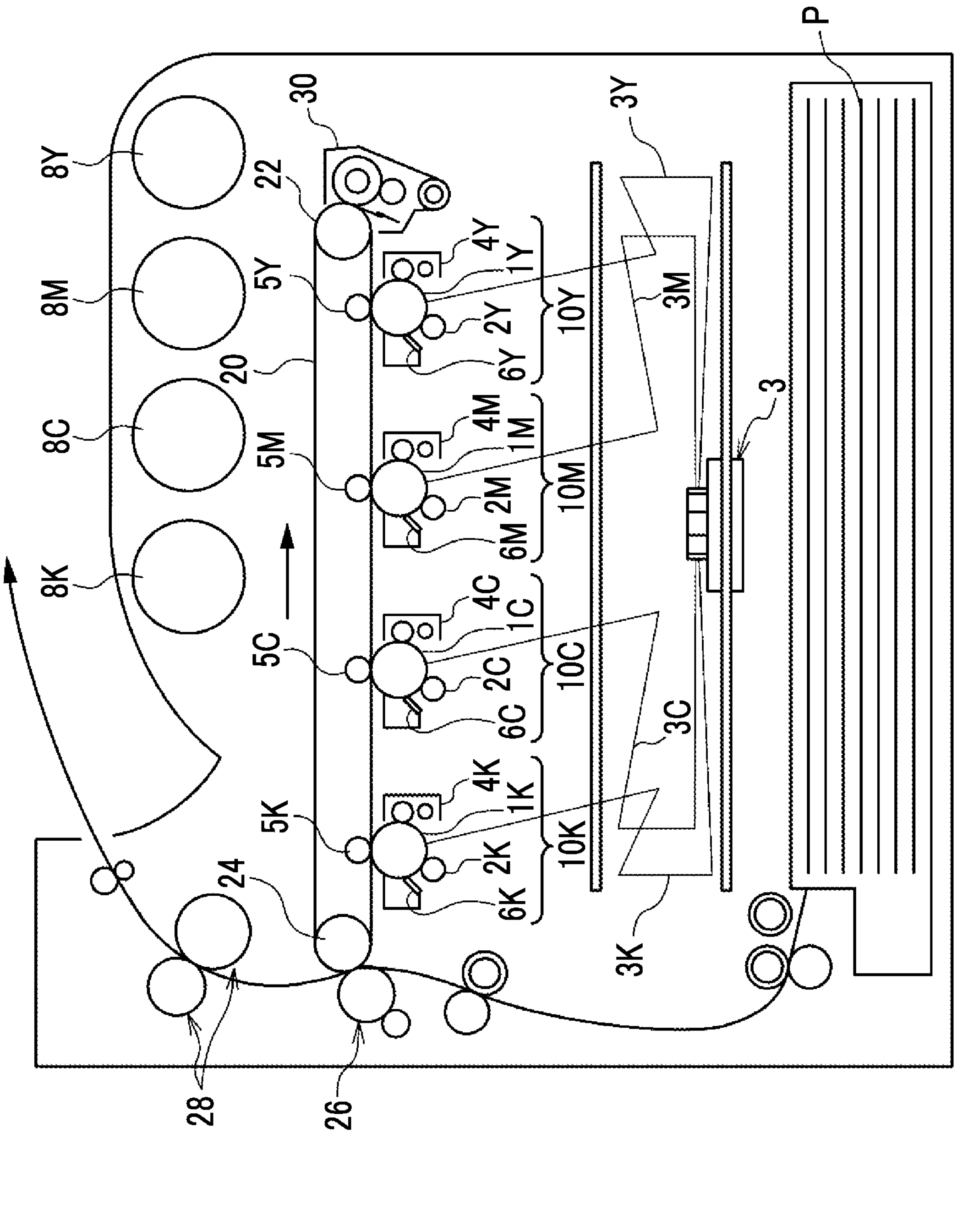
FIG. 7 is a view schematically showing the configuration of an image forming apparatus according to the present exemplary embodiment.

FIG. 7 is a view schematically showing the configuration of the image forming apparatus according to the present exemplary embodiment.

The image forming apparatus shown in FIG. 7 includes first to fourth electrophotographic image forming units 10Y, 10M, 10C, and 10K (image forming means) that output images of colors of yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are attached to and detached from the image forming apparatus.

Above the units 10Y, 10M, 10C, and 10K, an intermediate transfer belt 20 (an example of the intermediate transfer member) extends across each of the units. The intermediate transfer belt 20 is provided to be looped over a driving roll 22 and a support roll 24 and runs in a direction toward the fourth unit 10K from the first unit 10Y. Force is applied to the support roll 24 in a direction away from the driving roll 22 by a spring or the like (not shown in the drawing). Tension is applied to the intermediate transfer belt 20 looped over the two rolls. An intermediate transfer member cleaning device 30 facing the driving roll 22 is provided on a surface of the intermediate transfer belt 20 that is on an image holder side.

Figure 3:
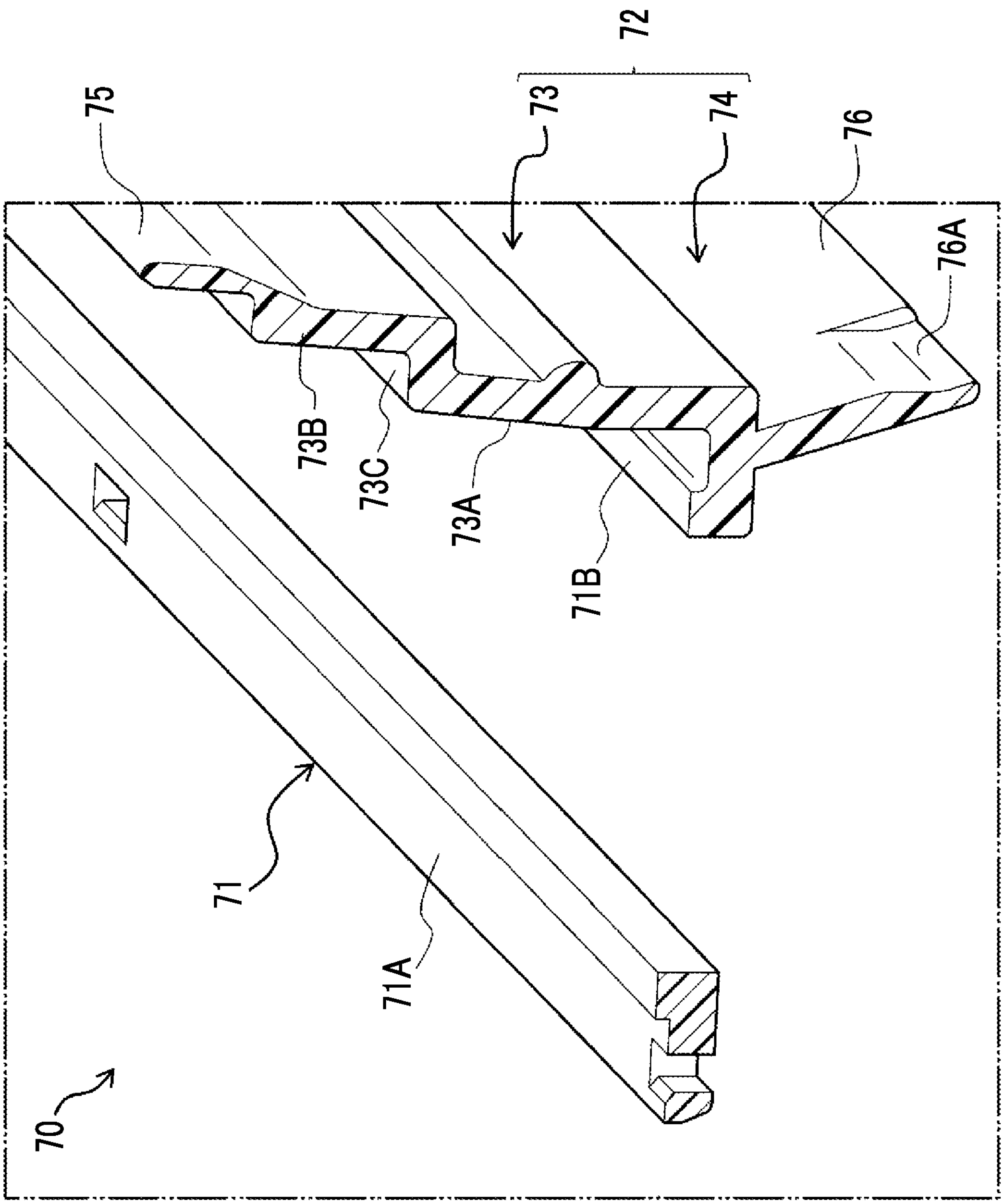
FIG. 3 is a cross-sectional view illustrating an integrated member according to the present exemplary embodiment.

The image forming apparatus shown in FIG. 3 has a configuration in which toner cartridges 8Y, 8M, 8C, and 8K, each of which is an example of a replenishing toner accommodation portion, are attached and detached. Developing devices 4Y, 4M, 4C, and 4K of the units 10Y, 10M, 10C, and 10K are connected to the toner cartridges 8Y, 8M, 8C, and 8K by toner supply paths (not shown), respectively. Through the toner supply paths, color toners are supplied to the developing devices 4Y, 4M, 4C, and 4K from the toner cartridges 8Y, 8M, 8C, and 8K. In a case where the amount of a toner accommodated in a toner cartridge is low, the toner cartridge is replaced.

Since the first to fourth units 10Y, 10M, 10C, and 10K have the same configuration and are operated in the same way, the first unit 10Y, which is placed on an upstream side in a running direction of the intermediate transfer belt and forms a yellow image, will be described as a representative.

The first unit 10Y has a photoreceptor 1Y that acts as an image holder. Around the photoreceptor 1Y, a charging roll 2Y (an example of a charging unit) that charges the surface of the photoreceptor 1Y at a predetermined potential, an exposure device 3 (an example of an electrostatic charge image forming unit) that exposes the charged surface to a laser beam 3Y based on color-separated image signals so as to form an electrostatic charge image, a developing device 4Y (an example of a developing unit) that develops the electrostatic charge image by supplying a charged toner to the electrostatic charge image, a primary transfer roll 5Y (an example of a primary transfer unit) that transfers the developed toner image onto the intermediate transfer belt 20, and a photoreceptor cleaning device 6Y (an example of a cleaning unit) that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y. A bias power supply (not shown in the drawing) for applying a primary transfer bias is connected to each of respective primary transfer rolls 5Y, 5M, 5C, and 5K of the units. Each bias power supply changes the value of a transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ω·cm or less) substrate. The photosensitive layer has properties in that although the layer usually has a high resistance (resistance of a general resin), in a case where the photosensitive layer is irradiated with the laser beam 3Y, the specific resistance of the portion irradiated with the laser beam changes. Therefore, from the exposure device 3, the laser beam 3Y is emitted to the surface of the charged photoreceptor 1Y according to image data for yellow transmitted from the control unit not shown in the drawing. In this way, an electrostatic charge image having a yellow image pattern is formed on the surface of the photoreceptor 1Y.

The electrostatic charge image is an image formed on the surface of the photoreceptor 1Y by charging. This image is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y is rotated to a predetermined development position as the photoreceptor 1Y runs. At the development position, the electrostatic charge image on the photoreceptor 1Y is made visible by being developed as a toner image by the developing device 4Y.

The developing device 4Y contains, for example, an electrostatic charge image developer that accommodates at least a yellow toner and a carrier. By being agitated in the developing device 4Y, the yellow toner undergoes triboelectrification, carries charges of the same polarity (negative charge) as the charges with which the surface of the photoreceptor 1Y is charged, and is held on a developer roll (an example of a developer holder). Then, as a surface of the photoreceptor 1Y passes through the developing device 4Y, the yellow toner electrostatically adheres to a neutralized latent image portion on the surface of the photoreceptor 1Y, and a latent image is developed by the yellow toner. The photoreceptor 1Y on which a yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner, and is controlled to, for example, +10 μA by the control unit (not illustrated) in the first unit 10Y.

Meanwhile, the residual toner on the photoreceptor 1Y is removed by the photoreceptor cleaning device 6Y and collected.

The primary transfer bias applied to the primary transfer rolls 5M, 5C, and 5K of the second unit 10M and the subsequent units is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superimposed and transferred in layers.

The intermediate transfer belt 20, to which the toner images of four colors are transferred in layers through the first to fourth units, reaches a secondary transfer portion composed of the intermediate transfer belt 20, the support roll 24 in contact with the inner surface of the intermediate transfer belt, and a secondary transfer roll 26 (an example of a secondary transfer unit) disposed on an image holding surface side of the intermediate transfer belt 20. Meanwhile, via a supply mechanism, recording paper P (an example of a recording medium) is supplied at a predetermined time to a gap between the secondary transfer roll 26 and the intermediate transfer belt 20 that are in contact with each other. Furthermore, a secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, which causes the toner image on the intermediate transfer belt 20 to be transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Then, the recording paper P is transported into a pressure contact portion (nip portion) of a pair of fixing rolls in a fixing device 28 (an example of a fixing unit), the toner image is fixed onto the recording paper P, and a fixed image is formed.

Examples of the recording paper P to which the toner image is to be transferred include plain paper used in electrophotographic copy machines, printers, and the like.

Examples of the recording medium also include an OHP sheet and the like, in addition to the recording paper P.

In order to further improve the smoothness of an image surface after fixation, for example, it is preferable that the surface of the recording paper P is also smooth. For example, coated paper obtained by coating a surface of plain paper with a resin or the like, art paper for printing, or the like is preferably used.

The recording paper P on which the color image has been fixed is transported to a discharge portion, and a series of color image forming operations is finished.

Developing Device 4

Next, the detailed configuration of the developing devices 4Y, 4M, 4C, and 4K will be described. The developing devices 4Y, 4M, 4C, and 4K have the same structure as each other. Hereinafter, the developing devices 4Y, 4M, 4C, and 4K will be simply referred to as "the developing devices 4" in a case where there the developing devices 4Y, 4M, 4C, and 4K are not to be particularly distinguished.

Figure 2:
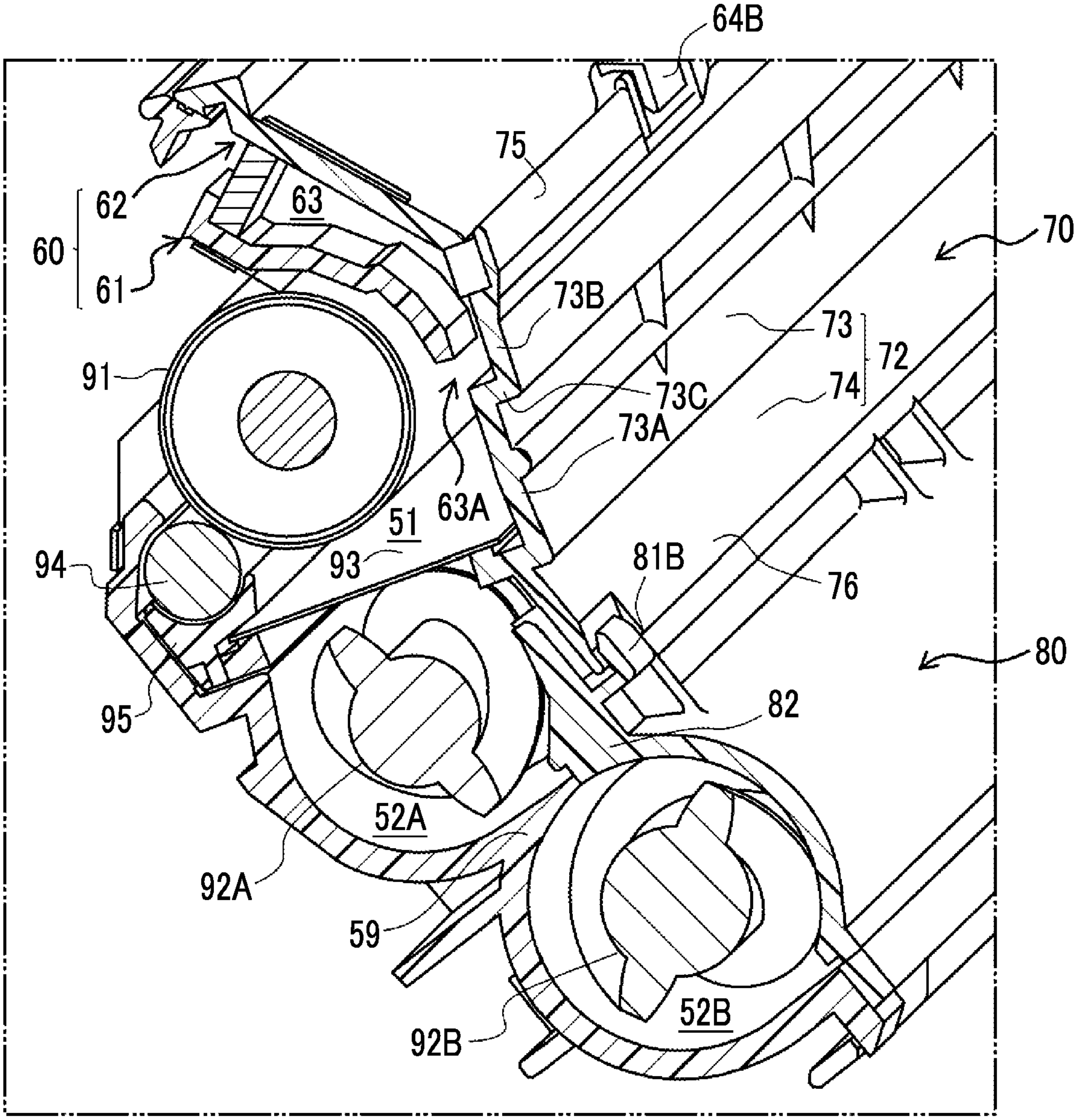
FIG. 2 is another cross-sectional view illustrating the developing device according to the present exemplary embodiment.

FIGS. 1 and 2 show the developing device 4.

The developing device 4 includes housing, a development roll 91, and agitating members 92A and 92B.

Inside the housing, developer accommodation spaces 52A and 52B that accommodate developers (not shown) and a roll accommodation space 51 that accommodates the development roll 91 are provided. The development roll 91 is accommodated in the roll accommodation space 51. The agitating members 92A and 92B are accommodated in the developer accommodation spaces 52A and 52B.

The agitating members 92A and 92B are composed of a first agitating member 92A and a second agitating member 92B.

The developer accommodation spaces 52A and 52B include a first developer accommodation space 52A in which the first agitating member 92A is disposed, and a second developer accommodation space 52B in which the second agitating member 92B is disposed. The first agitating member 92A is also called a supply auger, and the second agitating member 92B is also called an admixing auger.

The housing includes a first housing member 50 and second housing member.

The first housing member 50 is integrally formed.

The first housing member 50 includes a first portion 53 constituting an outer shell of the roll accommodation space 51, a second portion 54 constituting an outer shell of the first developer accommodation space 52A, and a third portion 55 constituting an outer shell of the second developer accommodation space 52B.

The first housing member 50 includes a pair of axial wall portions 56 (refer to FIG. 6) positioned on both sides in an axial direction with respect to the accommodation spaces 51, 52A, and 52B.

The second housing member constitutes the housing by being combined with the first housing member 50. A development opening 57 corresponding to the development roll 91 is formed in the housing.

Unlike the first housing member 50, the second housing member is not integrally formed. The second housing member includes a roll side member 60, an integrated member 70, and a developer side member 80.

The roll side member 60 constitutes the outer shell of the roll accommodation space 51. The roll side member 60 is disposed downstream of the development opening 57 in a rotation direction (a clockwise direction in FIG. 1) of the development roll 91.

The roll side member 60 includes an inner member 61 and an outer member 62.

The roll side member 60 has a two-layer structure in which the inner member 61 and the outer member 62 are combined with each other. Accordingly, in the developing device 4, an air flow path 63 connecting the roll accommodation space 51 and the outside of the housing is formed separately from the roll accommodation space 51.

The inner member 61 includes a general wall portion 61A that separates the roll accommodation space 51 and the air flow path 63 from each other.

The inner member 61 includes ribs 61B. Each rib 61B is erected on a surface of the general wall portion 61A that is on the air flow path 63 side, and a plate thickness direction thereof is parallel to the axial direction (a direction orthogonal to FIG. 1 (a direction along a rotation axis of the development roll 91)). A plurality of ribs 61B are formed along the axial direction. The plurality of ribs 61B divide the air flow path 63 into a plurality of flow paths in the axial direction.

The outer member 62 includes a general wall portion 62A that separates the air flow path 63 from the outside of the housing. The air flow path 63 is formed between the general wall portion 62A of the outer member 62 and the general wall portion 61A of the inner member 61. Since the air flow path 63 is formed, it is possible to cope with a so-called toner cloud.

Integrated Member 70

The integrated member 70 is a member obtained by integrally forming a seal attachment portion 71 and an outer shell portion 72 with each other.

The seal attachment portion 71 is a portion to which a seal member 93 that separates the developer accommodation spaces 52A and 52B from the roll accommodation space 51 is attached. The seal member 93 is, for example, a heat welding seal. The seal member 93 prevents a developer from moving toward the development roll 91 during transportation of the developing device 4, transportation of the image forming apparatus, and the like. The seal member 93 is peeled off from the developing device 4 at the time of use (a time before the developing device is mounted into the image forming apparatus or the like).

Figure 4A:
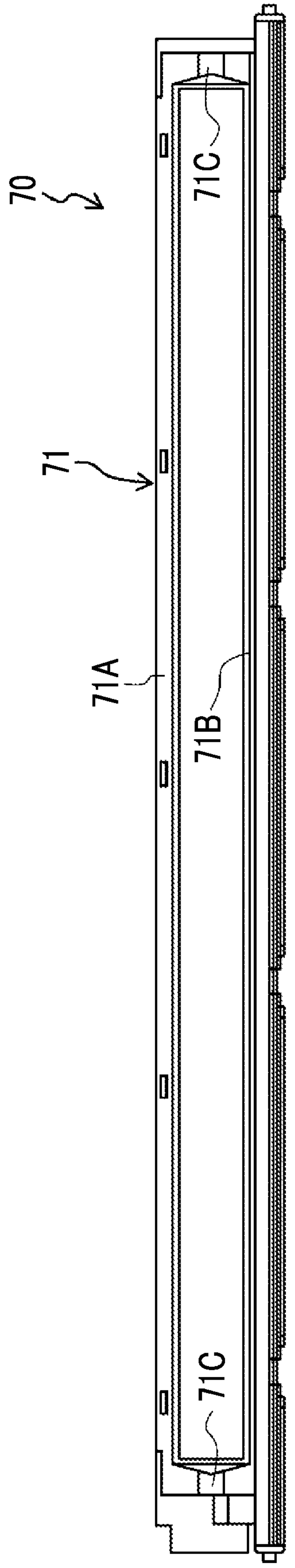
FIG. 4A is an overall view of the integrated member which illustrates the integrated member according to the present exemplary embodiment and FIG. 4B is a view as seen in another direction.
Figure 4B:
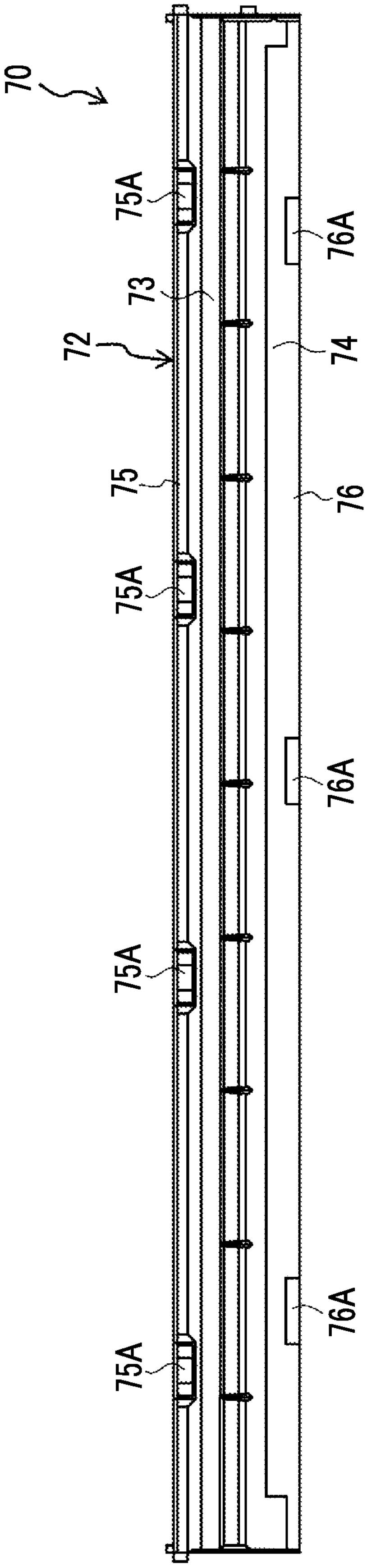

As shown in FIGS. 3 and 4, the seal attachment portion 71 includes a pair of axial portions 71A and 71B and a pair of connection portions 71C (refer to FIG. 4A). Accordingly, the seal attachment portion 71 is formed in a rectangular frame-like shape.

One axial portion 71A, which is one of the pair of axial portions 71A and 71B, is disposed close to the first housing member 50. The other axial portion 71B, which is the other of the pair of axial portions 71A and 71B, is disposed close to the second housing member.

The outer shell portion 72 of the integrated member 70 constitutes an outer shell that separates the inside and the outside of the housing from each other.

The outer shell portion 72 of the integrated member 70 includes a roll side outer shell portion 73 and a developer side outer shell portion 74. The roll side outer shell portion 73 constitutes the outer shell of the roll accommodation space 51, and the developer side outer shell portion 74 constitutes the outer shells of the developer accommodation spaces 52A and 52B.

Developer Side Member 80

The developer side member 80 constitutes the outer shells of the developer accommodation spaces 52A and 52B.

Figure 6:
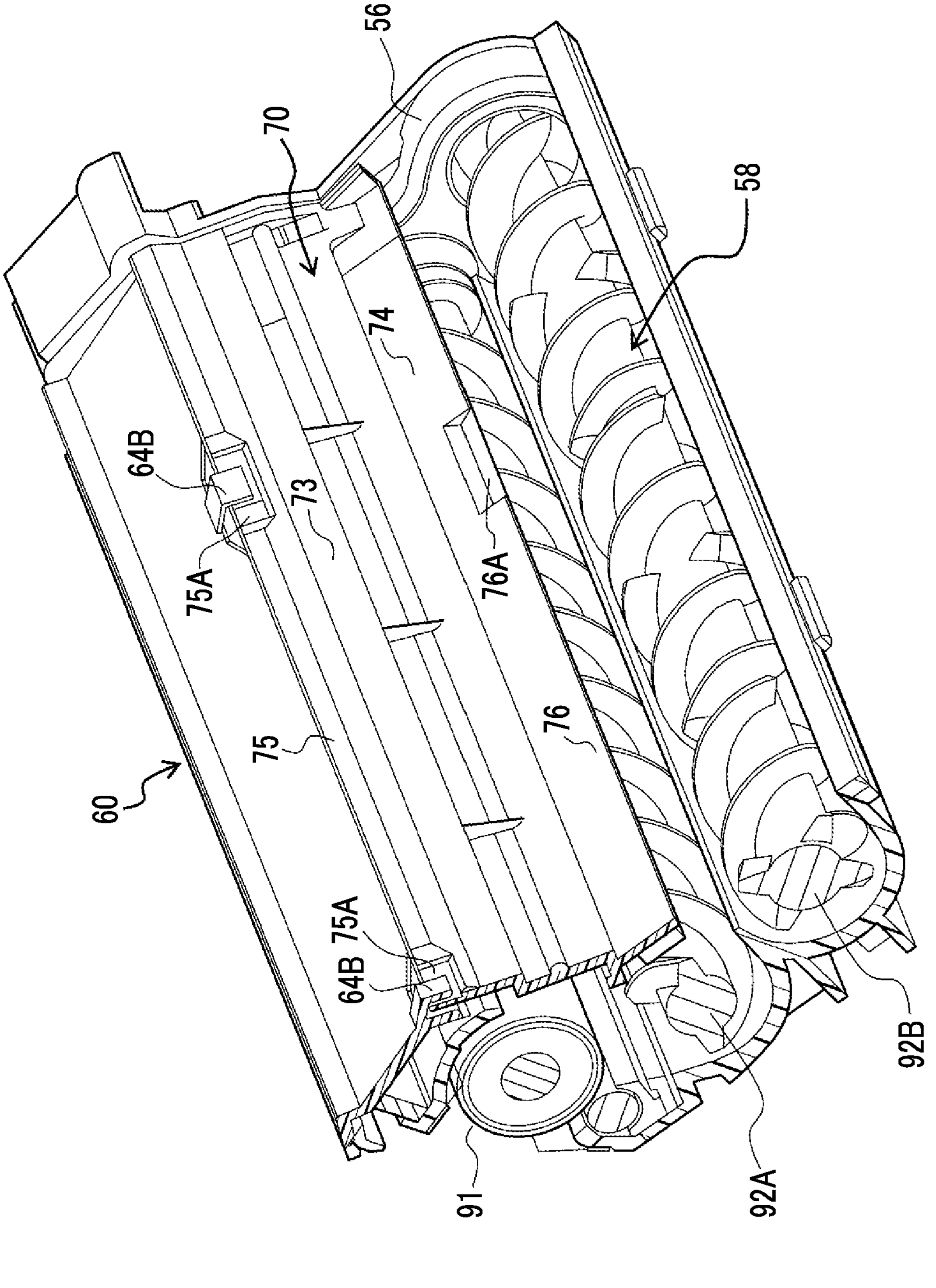
FIG. 6 is a cross-sectional view illustrating a state where a developer filling port of the developing device according to the present exemplary embodiment is open.

As shown in FIG. 6, a developer filling port 58 through which the developer accommodation spaces 52A and 52B are filled with a developer is formed in a state where the integrated member 70 is assembled to the first housing member 50. The developer filling port 58 is configured such that both of the first developer accommodation space 52A and the second developer accommodation space 52B can be filled with a developer. That is, the developer side member 80 serves as a lid closing the developer filling port 58.

About Roll Side Joint Portion

A part of the roll side outer shell portion 73 of the integrated member 70 is supported by the roll side member 60.

Specifically, a supporting target portion 75 is formed at the roll side outer shell portion 73, and a supporting portion 64 is formed at the roll side member 60.

The supporting portion 64 includes a base portion 64A and claw portions 64B. The base portion 64A is continuously formed along the axial direction. A plurality of claw portions 64B are formed at different positions in the axial direction.

The supporting target portion 75 is disposed outside the housings with respect to the base portion 64A and is disposed outside the housings with respect to the plurality of claw portions 64B. Accordingly, the supporting target portion 75 is in a state of being sandwiched between the base portion 64A and the plurality of claw portions 64B. A urethane seal (not shown) is attached to the supporting target portion 75. The urethane seal is disposed between the base portion 64A and the supporting target portion 75.

Recess portions 75A corresponding to the claw portions 64B are formed on the supporting target portion 75. The recess portions 75A are recessed toward the inside of the housings. Accordingly, an increase in dimensions of the housing at positions corresponding to the claw portions 64B is prevented.

A part of the developer side outer shell portion 74 of the integrated member 70 is supported by the developer side member 80.

Specifically, a supporting target portion 76 is formed at the developer side outer shell portion 74, and a supporting portion 81 is formed at the developer side member 80.

The supporting portion 81 includes a base portion 81A and claw portions 81B. The base portion 81A is continuously formed along the axial direction. A plurality of claw portions 81B are formed at different positions in the axial direction.

The supporting target portion 76 is disposed outside the housings with respect to the base portion 81A and is disposed outside the housings with respect to the plurality of claw portions 81B. Accordingly, the supporting target portion 76 is in a state of being sandwiched between the base portion 81A and the plurality of claw portions 81B. A urethane seal (not shown) is attached to the supporting target portion 76. The urethane seal is disposed between the base portion 81A and the supporting target portion 76.

Recess portions 76A corresponding to the claw portions 81B are formed on the supporting target portion 76. The recess portions 76A are recessed toward the inside of the housings. Accordingly, an increase in dimensions of the housing at positions corresponding to the claw portions 81B is prevented.

The developing device 4 includes a rod trimmer 94 and a block trimmer 95.

The block trimmer 95 is attached to the one axial portion 71A of the seal attachment portion 71 after the seal member 93 is attached to the seal attachment portion 71 of the integrated member 70.

The rod trimmer 94 is formed of metal and has a cylindrical shape. After the integrated member 70 is assembled to the first housing member 50, the rod trimmer 94 is assembled to be disposed on an arc-shaped surface of the block trimmer 95. Accordingly, the one axial portion 71A of the seal attachment portion 71 is unbent or is restrained from being bent.

As shown in FIG. 1, the first housing member 50 includes a partition wall portion 59 that separates the first developer accommodation space 52A and the second developer accommodation space 52B from each other. The partition wall portion 59 is formed at a boundary position between the second portion 54 and the third portion 55. Meanwhile, the developer side member 80 includes a partition wall contact portion 82 that comes into contact with the partition wall portion 59. Accordingly, the first developer accommodation space 52A and the second developer accommodation space 52B are separated from each other, and the developer side member 80 is restrained from being bent.

As shown in FIG. 2, a connection port 63A that leads to the air flow path 63 from the roll accommodation space 51 is formed by the roll side member 60 and the roll side outer shell portion 73.

Specifically, the roll side outer shell portion 73 of the integrated member 70 includes a corresponding-to-accommodation-space portion 73A and a corresponding-to-flow-path portion 73B. The corresponding-to-accommodation-space portion 73A constitutes a wall of the roll accommodation space 51, and the corresponding-to-flow-path portion 73B constitutes a wall of the air flow path 63. A step portion 73C is formed between the corresponding-to-accommodation-space portion 73A and the corresponding-to-flow-path portion 73B. In addition, the connection port 63A that leads to the air flow path 63 from the roll accommodation space 51 is formed between the general wall portion 61A of the inner member 61 of the roll side member 60 and the corresponding-to-accommodation-space portion 73A of the roll side outer shell portion 73.

Operation and Effect

Next, the operation and effect of the present exemplary embodiment will be described.

In the present exemplary embodiment, the developing device 4 includes the first housing member 50 and the second housing member.

The second housing members 60, 70, and 80 combines with the first housing member 50 to constitute the housing. Inside the housing, the developer accommodation spaces 52A and 52B that accommodate developers and the roll accommodation space 51 that accommodates the development roll 91 are provided.

Here, the second housing member includes the integrated member 70 obtained by integrally forming the seal attachment portion 71 and the outer shell portion 72 with each other.

The seal member 93 that separates the developer accommodation spaces 52A and 52B from the roll accommodation space 51 is attached to the seal attachment portion 71. The outer shell portion 72 constitutes an outer shell that separates the inside and the outside of the housing from each other.

That is, the seal attachment portion 71 is integrally formed with the outer shell portion 72 that constitutes the outer shell separating the inside and the outside of the housings. Therefore, the seal attachment portion 71 may be restrained from being bent without an increase in size of the housing in comparison with a case where a member with a seal attachment portion is completed only inside a housing.

More specifically, since a member (the integrated member 70) provided with the seal attachment portion 71 extends up to the outside of the housing, the other axial portion 71B of the seal attachment portion 71 is restrained from being bent in a perpendicular direction. In addition, since the member (the integrated member 70) provided with the seal attachment portion 71 includes a portion (the outer shell portion 72) that constitutes an outer shell separating the inside and the outside of the housings, the other axial portion 71B of the seal attachment portion 71 is restrained from being bent in a surface direction.

Note that, a bend in the surface direction herein means a bend of the axial portions 71A and 71B in the surface direction of the seal member 93 and means a bend of the other axial portion 71B toward the one axial portion 71A, for example. In addition, a bend in the perpendicular direction means a bend of the axial portions 71A and 71B in a direction perpendicular to a surface of the seal member 93.

In addition, in the present exemplary embodiment, the developer filling port 58 through which the developer accommodation spaces 52A and 52B are filled with a developer is formed in a state where the integrated member 70 is assembled to the first housing member 50. The second housing member include the developer side member 80 that closes the developer filling port 58.

Therefore, the developer accommodation spaces 52A and 52B may be filled with a developer in a state where the seal member 93 separates the developer accommodation spaces 52A and 52B and the roll accommodation space 51 from each other.

In addition, in the present exemplary embodiment, the developer accommodation spaces 52A and 52B include the first developer accommodation space 52A in which the first agitating member 92A is disposed, and the second developer accommodation space 52B in which the second agitating member 92B is disposed. In addition, the developer filling port 58 is configured such that both of the first developer accommodation space 52A and the second developer accommodation space 52B can be filled with a developer.

Therefore, a filling operation is easy in comparison with a case where only one of the accommodation spaces may be filled.

In addition, in the present exemplary embodiment, the first housing member 50 includes a partition wall portion that separates the first developer accommodation space 52A and the second developer accommodation space 52B from each other. The developer side member 80 includes the partition wall contact portion 82 that comes into contact with the partition wall portion 59.

Therefore, the developer side member 80 that closes the developer filling port 58 is restrained from being bent toward the first housing member 50.

In addition, in the present exemplary embodiment, the second housing member include the roll side member 60 that constitutes an outer shell separating the roll accommodation space 51 and the outside of the housing from each other.

Therefore, the degree of freedom in housing shape is improved for reasons related to the molding of the housings in comparison with a case where the second housing member do not include a member that constitutes the outer shell separating the roll accommodation space 51 and the outside of the housings from each other separately from the integrated member 70. As a result, the improvement contributes to size reduction of the entire apparatus (the image forming apparatus) including the developing device 4.

In addition, in the present exemplary embodiment, the roll side member 60 is disposed at a position overlapping with the seal attachment portion 71 as seen in a direction perpendicular to the seal member 93.

Therefore, the degree of freedom in shape of the developing devices 4 is improved in comparison with a case where the roll side member 60 is not disposed at a position overlapping with the seal attachment portion 71 and the improvement contributes to size reduction of the entire apparatus including the developing device 4.

Note that, as a different case, a case where the second housing member do not include the roll side member 60 separately from the integrated member 70 (in other words, the roll side member 60 is integrally formed with the integrated member 70) and the roll side member 60 is disposed at a position overlapping with the seal attachment portion 71 as seen in the direction perpendicular to the seal member 93 is conceivable. However, in such a case, the roll side member 60 inhibits an operation of attaching the seal member 93 to the seal attachment portion 71.

Figure 5:
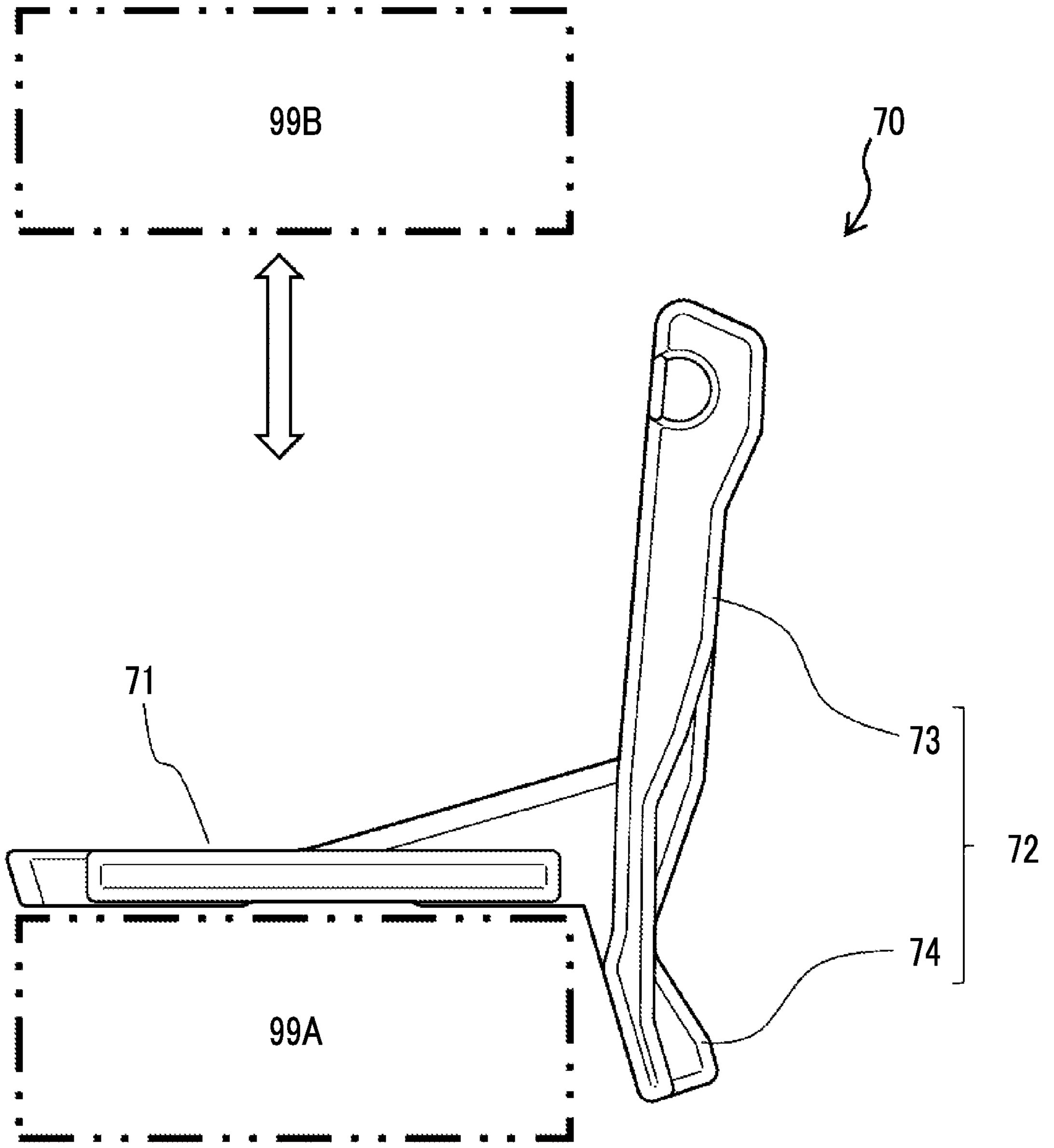
FIG. 5 is a view illustrating the integrated member according to the present exemplary embodiment.

However, in the present exemplary embodiment, as shown in FIG. 5, the other portion of the integrated member 70 is not disposed at a position overlapping with the seal attachment portion 71 as seen in the direction perpendicular to the seal member 93. Therefore, a welding jig 99B for welding of an installation jig 99A on which the seal attachment portion 71 is installed and the seal member 93 is not inhibited. That is, the welding jig 99B is not inhibited from moving in a direction along the arrow in FIG. 5.

In addition, in the present exemplary embodiment, in a state where the integrated member 70 and the roll side member 60 are assembled to the first housing member 50, the air flow path 63 that connects the roll accommodation space 51 and the outside of the housing is formed separately from the roll accommodation space 51.

Therefore, the developer scattered in the roll accommodation space 51 may be guided to the air flow path 63. As a result, a so-called toner cloud may be suppressed.

In addition, in the present exemplary embodiment, the outer shell portion 72 of the integrated member 70 includes the roll side outer shell portion 73 that constitutes the outer shell of the roll accommodation space 51. In addition, the connection port 63A that leads to the air flow path 63 from the roll accommodation space 51 is formed by the roll side member 60 and the roll side outer shell portion 73.

Therefore, the outer shell portion 72 of the integrated member 70 may be formed large toward the development roll 91 in comparison with a case where the connection port 63A is formed only by the roll side member 60. Since the outer shell portion 72 can be formed large, the seal attachment portion 71 can be further restrained from being bent.

Further, since the image forming apparatus according to the present exemplary embodiment includes the developing device 4 with which it is possible to restrain the seal attachment portion 71 from being bent while achieving size reduction, an image forming apparatus of which the size is small and in which the seal attachment portion 71 is restrained from being bent may be achieved.

In addition, in the present exemplary embodiment, the seal member 93 is attached to a surface of the seal attachment portion 71 that is on the roll accommodation space 51 side and a portion of the first agitating member 92A enters the inside (the inside of a frame) of the seal attachment portion 71. Therefore, size reduction of the developing device 4 is achieved.

Supplementary Description

Note that, in the above exemplary embodiment, an example in which the second housing member include the roll side member 60, the integrated member 70, and the developer side member 80 has been described. However, the present disclosure is not limited thereto. For example, the second housing members according to the exemplary embodiment of the present disclosure may be composed of an integrated member and a developer side member. That is, the roll side member 60 and the integrated member 70 in the above exemplary embodiment may be integrally formed with each other.

In addition, in the present exemplary embodiment, an example in which the outer shell portion 72 of the integrated member 70 includes the roll side outer shell portion 73 and the developer side outer shell portion 74 has been described. However, the present disclosure is not limited thereto. The outer shell portion of the integrated member according to the exemplary embodiment of the present disclosure may include only one of the roll side outer shell portion and the developer side outer shell portion.

In addition, in the present exemplary embodiment, an example in which the developing device 4 includes the rod trimmer 94 and the block trimmer 95 has been described. However, the present disclosure is not limited thereto. The developing device according to the exemplary embodiment of the present disclosure may not include the rod trimmer and the block trimmer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A developing device comprising:

a first housing member; and a second housing member combined with the first housing member constituting a housing of the developing device, wherein the housing of the developing device forms an inner space that includes a developer accommodation space accommodating a developer and a roll accommodation space accommodating a development roll, wherein the second housing member includes an integrated member and a developer side member, wherein the integrated member includes a frame-shaped seal attachment portion and an outer shell portion, wherein the seal attachment portion is disposed between the developer accommodation space and the roll accommodation space and is a portion to which a seal member separating the developer accommodation space and the roll accommodation space from each other is attached, and the outer shell portion constitutes an outer shell that separates an inside and an outside of the housing of the developing device from each other;

wherein a developer filling port through which the developer accommodation space is filled with the developer is formed in a state where the integrated member is attached to the first housing member, and the developer side member is attached between the first housing member and the integrated member to cover the developer filling port for forming the developer accommodation space.

2. The developing device according to claim 1, wherein the developer accommodation space includes a first developer accommodation space in which a first agitating member is disposed and a second developer accommodation space in which a second agitating member is disposed, and the developer filling port is configured such that both of the first developer accommodation space and the second developer accommodation space are filled with the developer.

3. The developing device according to claim 2, wherein the first housing member includes a partition wall portion that separates the first developer accommodation space and the second developer accommodation space from each other, and the developer side member includes a partition wall contact portion that comes into contact with the partition wall portion.

4. The developing device according to claim 3, wherein the second housing member includes a roll side member that constitutes an outer shell separating the roll accommodation space and the outside of the housing of the developing device from each other.

5. The developing device according to claim 4, wherein the roll side member is disposed at a position overlapping with the seal attachment portion as seen in a direction perpendicular to the seal member.

6. The developing device according to claim 4, wherein, in a state where the integrated member and the roll side member are assembled to the first housing member, an air flow path that connects the roll accommodation space and the outside of the housing is formed separately from the roll accommodation space.

7. The developing device according to claim 2, wherein the second housing member includes a roll side member that constitutes an outer shell separating the roll accommodation space and the outside of the housing of the developing device from each other.

8. The developing device according to claim 7, wherein the roll side member is disposed at a position overlapping with the seal attachment portion as seen in a direction perpendicular to the seal member.

9. The developing device according to claim 7, wherein, in a state where the integrated member and the roll side member are assembled to the first housing member, an air flow path that connects the roll accommodation space and the outside of the housing is formed separately from the roll accommodation space.

10. The developing device according to claim 1, wherein the second housing member includes a roll side member that constitutes an outer shell separating the roll accommodation space and the outside of the housing of the developing device from each other.

11. The developing device according to claim 10, wherein the roll side member is disposed at a position overlapping with the seal attachment portion as seen in a direction perpendicular to the seal member.

12. The developing device according to claim 11, wherein, in a state where the integrated member and the roll side member are assembled to the first housing member, an air flow path that connects the roll accommodation space and the outside of the housing is formed separately from the roll accommodation space.

13. The developing device according to claim 10, wherein, in a state where the integrated member and the roll side member are assembled to the first housing member, an air flow path that connects the roll accommodation space and the outside of the housing is formed separately from the roll accommodation space.

14. The developing device according to claim 13, wherein the outer shell portion of the integrated member includes a roll side outer shell portion that constitutes an outer shell of the roll accommodation space, and a connection port that leads to the air flow path from the roll accommodation space is formed by the roll side member and the roll side outer shell portion.

15. An image forming apparatus comprising:

the developing device according to claim 1.

* * * * *